(12) United States Patent
Svec

(10) Patent No.: US 11,426,915 B2
(45) Date of Patent: Aug. 30, 2022

(54) METHOD AND APPARATUS FOR DIE COATING A SUBSTRATE WITH HIGH VISCOSITY MATERIALS

(71) Applicant: Building Materials Investment Corporation, Dallas, TX (US)

(72) Inventor: James A. Svec, Kearny, NJ (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 17/377,580

(22) Filed: Jul. 16, 2021

(65) Prior Publication Data

US 2022/0024101 A1 Jan. 27, 2022

Related U.S. Application Data

(60) Provisional application No. 63/054,308, filed on Jul. 21, 2020.

(51) Int. Cl.
*B29C 48/15* (2019.01)
*B29C 48/00* (2019.01)
(Continued)

(52) U.S. Cl.
CPC ............ *B29C 48/15* (2019.02); *B29C 48/022* (2019.02); *B29C 48/07* (2019.02); *B29C 48/2552* (2019.02); *B29C 48/29* (2019.02); *B29C 48/365* (2019.02); *B29C 2948/92514* (2019.02); *B29C 2948/92828* (2019.02); *B29K 2309/08* (2013.01); *B29K 2313/00* (2013.01); *B29L 2031/108* (2013.01)

(58) Field of Classification Search
CPC ..... B29C 48/15; B29C 48/154; B29C 48/156; B29C 48/157; B29C 48/022; B29C 48/07; B29C 48/2552; B29C 48/29; B29C 48/365; B29C 2948/92514; B29C 2948/92828; B29C 2948/92085; B29C 2948/92447; B29C 48/0021; B29C 48/151; B29C 48/255; B29C 48/297; B29C 48/305; B29C 48/36; B29C 48/475; B29C 48/72; B29C 48/725; B29K 2309/08; B29K 2313/00; B29L 2031/108

See application file for complete search history.

(56) References Cited

U.S. PATENT DOCUMENTS

| | | | |
|---|---|---|---|
| 1,365,947 A | | 1/1921 | Overbury |
| 3,227,136 A | * | 1/1966 | Bartlett ................... B05C 5/00 |
| | | | 118/410 |

(Continued)

*Primary Examiner* — Jeffrey M Wollschlager
(74) *Attorney, Agent, or Firm* — Womble Bond Dickinson (US) LLP

(57) ABSTRACT

A method is disclosed for die coating a moving substrate with a high viscosity material such as a polymer. The method includes heating and mixing ingredients to form a homogenous mixture, pumping the mixture around a circulation loop with a first pump, maintaining a predetermined pressure of the mixture within the circulation loop, drawing mixture from the circulation loop with a second pump, delivering the mixture using the second pump to an extrusion die adjacent the moving substrate to coat the substrate, and controlling the second pump as a function of at least the speed of the moving substrate to maintain predetermined characteristics of the coating mixture applied to the moving substrate. An apparatus for carrying out the method also is disclosed.

18 Claims, 3 Drawing Sheets

(51) Int. Cl.
  *B29C 48/07* (2019.01)
  *B29C 48/29* (2019.01)
  *B29C 48/255* (2019.01)
  *B29C 48/365* (2019.01)
  *B29L 31/10* (2006.01)
  *B29K 309/08* (2006.01)

(56) References Cited

U.S. PATENT DOCUMENTS

| | | | |
|---|---|---|---|
| 3,694,119 | A | 9/1972 | Scheibling |
| 3,745,200 | A * | 7/1973 | Geyer .................. B29C 48/686 |
| | | | 264/211.21 |
| 4,667,879 | A * | 5/1987 | Muller .................... B29C 48/31 |
| | | | 239/133 |
| 5,554,325 | A * | 9/1996 | Kotte .................... B29C 48/155 |
| | | | 156/107 |
| 5,637,665 | A * | 6/1997 | Sustic .................... C08F 210/06 |
| | | | 526/125.3 |
| 5,650,011 | A * | 7/1997 | Yoshinaga ............ B05C 5/0254 |
| | | | 118/316 |
| 5,698,302 | A | 12/1997 | Brandon et al. |
| 5,902,683 | A | 5/1999 | Sieloff |
| 6,228,785 | B1 | 5/2001 | Miller et al. |
| 6,341,462 | B2 | 1/2002 | Kiik et al. |
| 6,564,682 | B1 | 2/2003 | Leavell |
| 6,546,688 | B1 | 4/2003 | Parsons |
| 6,709,994 | B2 | 3/2004 | Miller et al. |
| 6,808,785 | B1 | 10/2004 | Friedman et al. |
| 6,864,195 | B2 | 3/2005 | Peng |
| 7,048,990 | B2 | 5/2006 | Koschitzky |
| 7,070,843 | B2 | 7/2006 | Bartek et al. |
| 7,070,844 | B2 | 7/2006 | Bartek |
| 7,140,153 | B1 | 11/2006 | Humphreys et al. |
| 7,442,270 | B2 | 10/2008 | Bartek |
| 7,442,658 | B2 | 10/2008 | Rodriques et al. |
| 7,670,668 | B2 | 3/2010 | Greaves et al. |
| 7,851,051 | B2 | 12/2010 | DeJarnette et al. |
| 7,867,562 | B2 | 1/2011 | Wisniewski et al. |
| 8,226,790 | B2 | 7/2012 | Rodriques et al. |
| 8,266,861 | B2 | 9/2012 | Koch et al. |
| 8,277,881 | B2 | 10/2012 | Khan et al. |
| 8,293,162 | B2 * | 10/2012 | Yokoyama ........... C08G 63/785 |
| | | | 425/149 |
| 8,309,169 | B2 | 11/2012 | Teng et al. |
| 8,333,040 | B2 | 12/2012 | Shiao et al. |
| 8,389,103 | B2 | 3/2013 | Kiik et al. |
| 8,453,699 | B2 * | 6/2013 | Toriumi .................. B29C 48/08 |
| | | | 156/244.11 |
| 8,557,366 | B2 | 10/2013 | Harrington, Jr. et al. |
| 8,826,607 | B2 | 9/2014 | Shiao et al. |
| 9,695,342 | B2 * | 7/2017 | Sustic .................... C09J 123/20 |
| 10,195,640 | B2 | 2/2019 | Svec |
| 10,724,243 | B2 | 7/2020 | Leitch et al. |
| 2002/0166637 | A1 | 11/2002 | Kobajashi et al. |
| 2003/0188503 | A1 | 10/2003 | Parsons |
| 2004/0014385 | A1 | 1/2004 | Greaves, Jr. et al. |
| 2004/0081789 | A1 | 4/2004 | Kim |
| 2004/0177596 | A1 | 9/2004 | Jolitz et al. |
| 2004/0178532 | A1 | 9/2004 | Jolitz et al. |
| 2005/0210808 | A1 | 9/2005 | Larson et al. |
| 2006/0172643 | A1 | 8/2006 | Greaves et al. |
| 2009/0260309 | A1 | 10/2009 | Humphreys et al. |
| 2010/0005745 | A1 | 1/2010 | Harrington, Jr. |
| 2010/0212235 | A1 | 8/2010 | Barrego |
| 2010/0310765 | A1 * | 12/2010 | Olsson ................ B05C 11/1013 |
| | | | 427/207.1 |
| 2011/0017278 | A1 | 1/2011 | Kalkanoglu et al. |
| 2011/0104461 | A1 | 5/2011 | Grubka |
| 2011/0197534 | A1 | 8/2011 | Belt et al. |
| 2011/0232220 | A1 | 9/2011 | Belt et al. |
| 2012/0138212 | A1 * | 6/2012 | Toriumi ................ B29C 48/155 |
| | | | 156/500 |
| 2012/0180400 | A1 * | 7/2012 | Benson-Sargent ......................... |
| | | | C08G 18/6607 |
| | | | 51/296 |
| 2014/0259820 | A1 | 9/2014 | Humphreys et al. |
| 2016/0375463 | A1 * | 12/2016 | Svec .................... B05C 5/0254 |
| | | | 427/424 |
| 2020/0347600 | A1 | 11/2020 | Leitch et al. |
| 2021/0214592 | A1 * | 7/2021 | Nelson .................. C09J 147/00 |

* cited by examiner

METHOD AND APPARATUS FOR DIE COATING A SUBSTRATE WITH HIGH VISCOSITY MATERIALS

REFERENCE TO RELATED APPLICATIONS

The present patent application claims benefit of U.S. Provisional Patent Application No. 63/054,308, filed Jul. 21, 2020.

INCORPORATION BY REFERENCE

U.S. Provisional Patent Application No. 63/054,308, filed Jul. 21, 2020, is specifically incorporation by reference herein as if set forth in its entirety.

TECHNICAL FIELD

This disclosure relates generally to roofing product fabrication and more specifically to the fabrication of a mat substrate coated with high viscosity non-asphaltic materials.

BACKGROUND

Coating a substrate with material such as asphalt to provide waterproofing and other properties is known in roofing product manufacturing. More recently, a desire to coat such substrates with non-asphaltic polymeric materials has arisen. Such polymeric materials typically have viscosities significantly higher than the viscosity of asphaltic coatings. As a consequence, traditional asphalt coating techniques often are not effective for applying non-asphaltic coatings at commonly used speeds of a shingle manufacturing line. A need exists for a method and apparatus for coating a substrate with high viscosity non-asphaltic materials at traditional and higher manufacturing line speeds while controlling the characteristics and quality of the resulting coating. It is to the provision of such a method and apparatus that the present disclosure is primarily directed.

SUMMARY

Briefly described, a method of coating a moving substrate comprises heating and mixing a coating material in a mix tank, pumping the heated and mixed material around a circulation loop from the mix tank; through the circulation loop, and back to the mix tank with a first pump; maintaining a predetermined pressure of the heated and mixed material within the circulation loop; extracting part of the heated and mixed material from the circulation loop with a second pump; delivering the extracted part of the heated and mixed material to a die with the second pump; applying the extracted part of the heated and mixed material to the moving substrate with the die, and controlling the second pump as a function of at least the speed of the moving substrate to affect the characteristics and quality of the resulting coating.

Aspects of the present disclosure include a method comprising the steps of: moving a substrate along a processing path at a line speed; mixing a viscous material having a viscosity of 10,000 cP to 20,000 cP at 375° Fahrenheit in a tank to obtain a mixture; pumping the coating mixture from the tank, through a circulation loop, and back to the tank using a first pump; controlling a pressure in the circulation loop as the mixture circulates through the circulation loop; extracting at least part of the mixture from the circulation loop using a second pump coupled to the circulation loop; using the second pump, pumping the at least part of the mixture through an extrusion die and onto the substrate; and controlling the pumping of the at least part of the mixture by the second pump based, at least in part, on the line speed so that a coating of the mixture is deposited onto the substrate by the extrusion die as the substrate is moved along the processing path at the line speed.

In embodiments of the method, the step of moving the substrate comprises moving a shingle material along the processing path, wherein the shingle material comprises a glass mat.

In embodiments of the method, the viscous material comprises a non-asphaltic material. In some embodiments, the viscous material comprises a polymer based material.

In some embodiments of the method, a pressure in the circulation loop is 50 psi to 150 psi.

In embodiments, the extrusion die comprises a pultrusion die. In some embodiments, the step of moving the substrate further comprises moving the substrate through the pultrusion die.

In embodiments, the step of controlling the pumping of the at least part of the mixture by the second pump comprises controlling the second pump with a variable speed drive. In some embodiments, the variable speed drive comprises a servo motor. In embodiments, the step of controlling the pumping of the at least part of the mixture by the second pump further comprises controlling the variable speed drive with a closed loop controller configured to monitor at least the line speed of the substrate and control a speed of the variable speed drive as a function of the line speed.

In some embodiments the second pump comprises a positive displacement pump.

In other embodiments, the extrusion die is configured to apply a coating to two sides of the substrate. In some embodiments, the method further comprises the steps of mixing a second viscous material having a viscosity of 10,000 cps to 20,000 cps at 375° Fahrenheit in a second tank to obtain a second mixture; pumping the second mixture from the tank, through a second circulation loop, and back to the second tank using a third pump; controlling a pressure in the second circulation loop as the second mixture circulates through the second circulation loop; extracting at least part of the second mixture from the second circulation loop using a fourth pump coupled to the second circulation loop; using the fourth pump, pumping the at least part of the second mixture through the extrusion die and onto a second surface of the substrate; and controlling the pumping of the fourth pump based, at least in part, on the line speed of the substrate moving along the processing path so that a coating of the second viscous material is deposited by the extrusion die onto the second surface of the moving substrate.

In other aspects of the present disclosure, an apparatus is provided, the apparatus comprising: a conveyor configured to move the substrate along a processing path at a line speed; a melt tank for containing, melting, and mixing a high viscosity material to obtain a mixture; wherein the high viscosity material has a viscosity of 10,000 cP to 20,000 cP at 375° Fahrenheit; a circulation loop coupled to the melt tank for circulation of the mixture from the melt tank, through the circulation loop, and back to the melt tank; a first pump coupled to the circulation loop and configured for circulating the mixture through the circulation loop; a pressure control device in the circulation loop, the pressure control device configured to maintain a predetermined pressure of the mixture within the circulation loop; a second pump coupled to the circulation loop, the second pump configured to extract part of the mixture from the circulation loop; an extrusion die coupled to the second pump for delivering the part of the mixture extracted from the circulation loop by the second pump onto the substrate as the substrate is moved along the processing path; and a controller configured to control the second pump as a function at least of the line speed of the substrate moving along the processing path so that a coating of the mixture is deposited by the extrusion die onto the substrate as the substrate is moved along processing path at the line speed.

In embodiments, the second pump comprises a positive displacement pump.

In embodiments, the apparatus further comprises a variable speed drive coupled to the second pump and configured to drive the second pump; and wherein the controller comprises a closed loop controller configured to monitor at least the line speed of the substrate moving along the processing path and control a speed of the variable speed drive as a function of the line speed.

In some embodiments, the extrusion die comprises a pultrusion die.

In embodiments, the predetermined pressure is 50 psi to 100 psi.

In embodiments, the high viscosity material comprises a non-asphaltic material. In some embodiments, the high viscosity material comprises a polymer.

Accordingly, an apparatus and methods for fabrication of a substrate with high viscosity non-asphaltic materials for forming roofing products that are directed to the above-discussed and other needs are disclosed. The foregoing and various other aspects, features, and advantages of the present disclosure will become more apparent upon review of the detailed description set forth below taken in conjunction with the accompanying drawing figures. Moreover, it is to be understood that both the foregoing summary of the disclosure and the following detailed description are exemplary and intended to provide further explanation without limiting the scope of the present disclosure.

BRIEF DESCRIPTION OF THE DRAWINGS

The accompanying drawings, which are included to provide a further understanding of the embodiments discussed in the present disclosure, are incorporated in and constitute a part of this specification, illustrate embodiments of this disclosure, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

DETAILED DESCRIPTION

The term "high viscosity material" as used herein refers to materials having a viscosity higher than that of a traditional asphaltic coating applied to a substrate in roofing product manufacturing. For example, a viscosity between 10,000 centipoise (cP) and 20,000 cP at 375° F. illustrate what is meant by "high viscosity" in this disclosure. An example of a "high viscosity material" as used herein is a non-asphaltic material such as a polymer or a polymer blend having a high viscosity.

Figure 1:
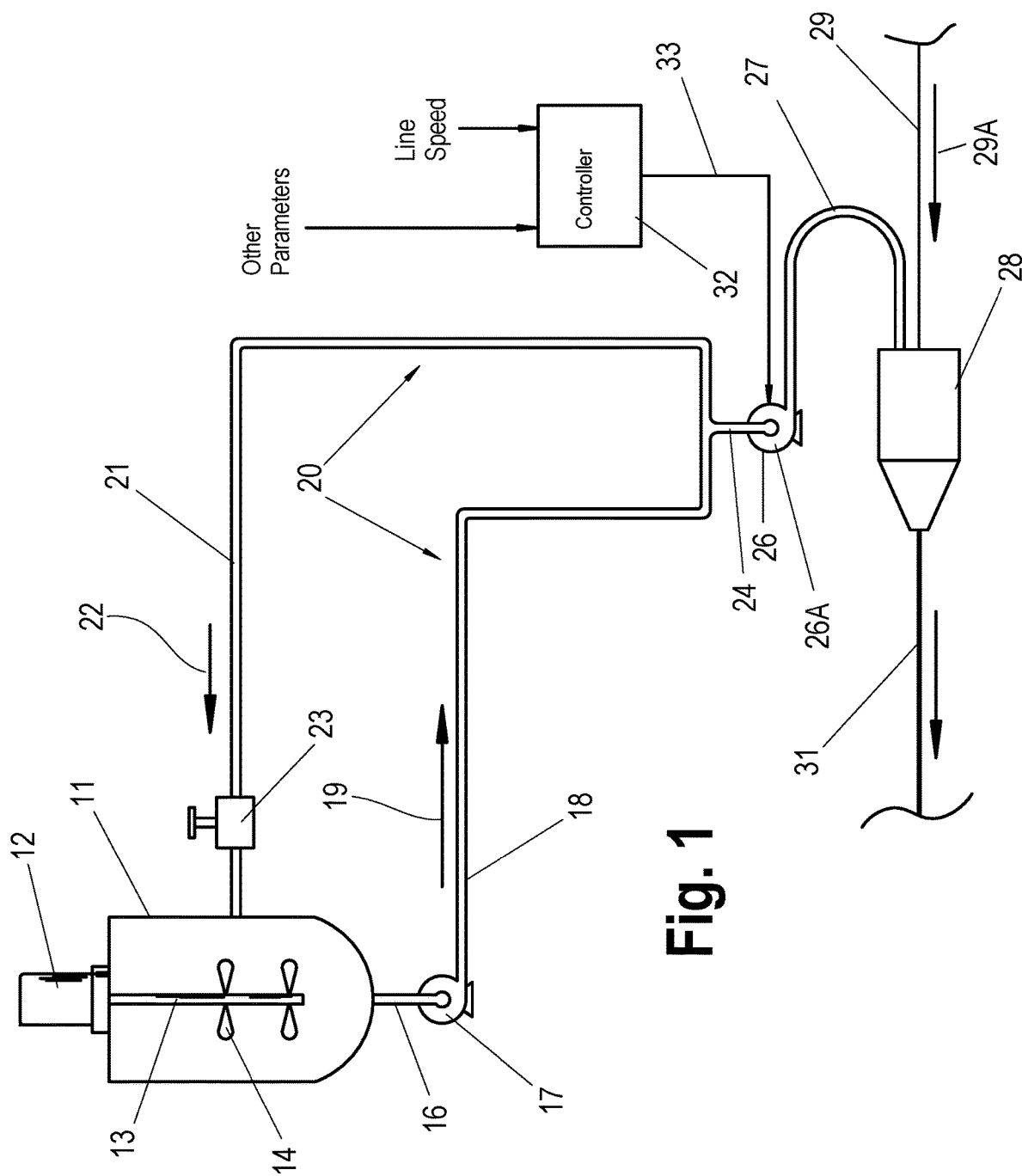
FIG. 1 is a schematic diagram of an example apparatus for carrying out the method disclosed herein.

Referring in more detail to FIG. 1, a substrate 29 is moved in a processing direction along a processing path as indicated by the arrows 29A. In some example embodiments, the substrate 29 can include a shingle material such as a glass mat. Other materials also can be used, including, for example and without limitation, non-woven webs. The substrate 29 passes through a die 28, where it is coated with a high viscosity material to produce a coated substrate 31. The die 28 can be any appropriate extrusion die such as, for example, a pultrusion slot die such as that disclosed in U.S. Pat. No. 10,195,640, the disclosure of which is incorporated by reference.

An example apparatus embodying the present disclosure is shown in FIG. 1, and comprises a heating and mix tank 11 for containing, heating, and mixing a high viscosity material (e.g., to form a mixture) to be coated onto the substrate 29. The tank 11 may, for example, comprise a hot oil jacketed tank with a motor 12 that drives a shaft 13 to which is attached agitator blades or paddles 14. In embodiments, the motor 12 can comprise a 30 hp motor; and, in some embodiments, can include a 15 hp to 50 hp, 15 hp to 45 hp, 15 hp to 40 hp, 15 hp to 35 hp, 15 hp to 30 hp, 15 hp to 25 hp, 15 hp to 20 hp, 20 hp to 50 hp, 20 hp to 45 hp, 20 hp to 35 hp, 20 hp to 30 hp, 20 hp to 25 hp, 25 hp to 50 hp, 25 hp to 45 hp, 25 hp to 40 hp, 25 hp to 35 hp, 25 hp to 30 hp, 30 hp to 50 hp, 30 hp to 45 hp, 30 hp to 40 hp, 30 hp to 35 hp, 35 hp to 50 hp, 35 hp to 45 hp, 35 hp to 40 hp, 40 hp to 50 hp, 40 hp to 45 hp, or 45 hp to 50 hp. The agitator blades or paddles 14 mix the high viscosity material thoroughly to form a substantially homogenous mixture. Within the tank 11, the mixture formed from the high viscosity material is heated, such as by the tank 11 being heated by the hot oil jacket or another heating mechanism, to a consistency appropriate for extrusion of the mixture through the die 28 and onto the moving substrate 29.

An extraction line 16 communicates with the mixture in the tank 11 and a first pump 17 coupled to the extraction line 16 is configured to draw the heated mixture from the tank 11. The first pump 17 moves mixture through an outlet line 18 in direction 19, around a circulation loop 20, and back to the tank 11 through a return line 21, as indicated by arrow 22. A pressure control valve 23 is coupled in the return line 21 and is adjustable to maintain a predetermined pressure of the mixture within the circulation loop 20. For example, the pressure control valve 23 may maintain a pressure within the circulation loop 20 of 50-200 psi, 50-150 psi, 50-125 psi, 50-100 psi, 50-75 psi, 75-200 psi, 75-150 psi, 75-125 psi, 75-100 psi, 75-90 psi, 90-200 psi, 90-150 psi, 90-125 psi, 90 to 110 psi, 90-100 psi, 95-105 psi, 100-125 psi, 100-150 psi, and/or 100-200 psi. In some embodiments, a pressure of at least 100 psi has been used in methods according to the principles of the present disclosure, but it will be understood that the present disclosure is not limited by this finding. In addition, in embodiments, the first pump 17 further can be configured with a pressure bypass valve such that, in the event a pressure of the mixture being pumped through the first pump 17 exceeds the predetermined pressure within the circulation loop 20, a portion of the mixture can be fed back to the tank 11 through the bypass valve to reduce the pressure therein.

As indicated in FIG. 1, a suction line 24 extends from the second pump 26 and communicates with the circulation loop 20. A second pump 26 is attached to the suction line 24 and is configured to extract at least a part of the mixture circulating through the circulation loop 20 from the circulation loop 20 through the suction line 24, and pump the extracted mixture through a supply line 27 to the die 28. The supply line 27 generally will include a flexible hose or conduit having a pressure rating of up to about 3000 psi. In addition, in embodiments, the supply line 27 can include a shield or protective covering encasing the supply line, such that if the supply line 27 were to rupture, the extracted mixture within the suction line 27 will be contained therewith.

The second pump 26 may be any appropriate type of pump able to draw the mixture (e.g., formed from a high viscosity material) at the pressure within the circulation loop 20 and deliver the mixture at a higher pressure to the die 28. In embodiments of the present disclosure, a positive displacement pump is used, as one example of the second pump 26, though the present disclosure is not limited by this finding. Still further, in embodiments, a burst disc can be provided adjacent the outlet of the second pump 26. The burst disc can be configured to rupture when a pressure of the inlet of the second pump 26 exceeds 1000 psi; for example, in the event that a blockage forms as the mixture cools, or as other issues arise such that the pressure of the mixture moving through the second pump 26 exceeds the pressure threshold of the burst disc, the second pump 26 can be shutdown.

The mixture can be delivered to the die 28 at pressures of between, but not limited to, approximately 100 psi to 2000 psi, which pressures can vary depending on a viscosity and/or pressure of the mixture supplied and line speed at which the substrate 29 is moved by the conveyor along the processing path for application of the mixture thereto. In some embodiments, the mixture can be delivered at pressures of 100 psi to 1500 psi. In other embodiments, the material can be delivered at pressures of 100 psi to 1000 psi. In still other embodiments, the material can be delivered at pressures of 100 psi to 500 psi.

In further embodiments, the material can be delivered at pressures of 200 psi to 2000 psi, 200 psi to 1500 psi, 200 psi to 1000 psi, 200 psi to 500 psi, 300 psi to 2000 psi, 300 psi to 1500 psi, 300 psi to 1000 psi, 300 psi to 500 psi, 400 psi to 2000 psi, 400 psi to 1500 psi, 400 psi to 1000 psi, 400 psi to 500 psi, 500 psi to 2000 psi, 1000 psi to 2000 psi; 100 psi to 500 psi, 100 psi to 400 psi, 100 psi to 300 psi, 100 psi to 200 psi, 200 psi to 1500 psi, and 500 psi to 1000 psi. Other ranges of pressures also can be used.

The second pump 26 may include a variable speed drive 26A, such as, for example, a controllable servo motor, a variable frequency drive VFD), an AC motor or other variable drive. In embodiments, the variable speed drive can include a 30 hp to 50 hp motor, and in some embodiments can include a motor with 15 hp to 70 hp, 15 hp to 60 hp, 15 hp to 50 hp, 15 hp to 40 Hp, 15 hp to 50 hp, 15 hp to 40 hp, 15 hp to 30 hp, 15 hp to 20 hp, 25 hp to 70 hp, 25 hp to 60 hp, 25 hp to 50 hp, 25 hp to 40 hp, 25 hp to 30 hp, 35 hp to 70 hp, 35 hp to 60 hp, 35 hp to 50 hp, 35 hp to 40 hp, 45 hp to 70 hp, 45 hp to 60 hp, 45 hp to 50 hp, 50 hp to 70 hp, 50 hp to 54 hp, 50 hp to 60 hp, or 50 hp to 55 hp.

The variable speed drive can be controlled so that the second pump 26 constantly delivers a desired volume of the mixture at a desired rate to the die 28 for application as a coating on the substrate 29. An electronic controller 32, such as a computer-based closed loop controller, receives input data from remote sensors. The data includes at least the current line speed at which the substrate 29 is being moved and may include other parameters such as, pressure of the mixture extracted by the second pump 26 and fed to the die 28, temperature data for the mixture, coating thickness data, and coating consistency data.

In some embodiments, the line speed of the substrate 29 can be used to maintain a selected temperature of the substrate 29 as it is coated. For example, the line speed can be controlled to maintain a temperature of 300° F. to 450° F. In some embodiments, the line speed is controlled to maintain a temperature of 300° F. to 400° F., 300° F. to 350° F., 300° F. to 325° F., 350° F. to 450° F., 350° F. to 400° F. or 400° F. to 450° F. The selected temperature of the substrate 29 and other selected parameters such as coating thickness and coating consistency can vary depending on the mixture (e.g., based on the type of high viscosity material) being applied to the substrate 29.

Based on the input data, the controller 32 is programmed to calculate, continuously and in real time, the appropriate mixture flow that will result in a consistent coating of a predetermined thickness of the mixture on the substrate 29. Based on these calculations, the controller 32 substantially constantly sends control signals through control link 33 to the variable speed drive of the second pump 26 to maintain the appropriate mixture flow to the die 28. In embodiments, the operation of the variable speed drive can be controlled based on the line speed at which the substrate 29 is moved to control the pumping speed of the second pump 26 as needed to adjust the pressure of the mixture applied for coating to the substrate 29 based on line speed of the substrate, e.g. for a line speed of 500 ft./min., the pressure of the mixture pumped from the second pump 26 can be approximately 200 psi, while for greater line speeds of such as 1000 ft./min., the pressure of the mixture pumped from the second pump 26 can be approximately 600 psi. The pressure at which the mixture is pumped from the second pump 26 can further vary with the line speed of the substrate, for example, with the mixture being pumped from the second pump at higher pressures for faster line speeds. Such continuous monitoring and control is desirable because, among other things, the line speed of the moving substrate 29 can vary with time.

In use, it may be necessary for an operator initially to observe the coating being applied to the substrate 29 and initialize the controller 32 when the consistency and coating thickness of mixture along the substrate 29 are observed to be correct. For example, such operator oversight might be used during start-up of the system, such as for tuning or initially setting a coating thickness. Thereafter, the controller 32 can vary the variable speed drive of the second pump 26 to maintain operating conditions such as the coating thickness, as line speed and possibly other conditions vary during the manufacturing process.

Figure 2:
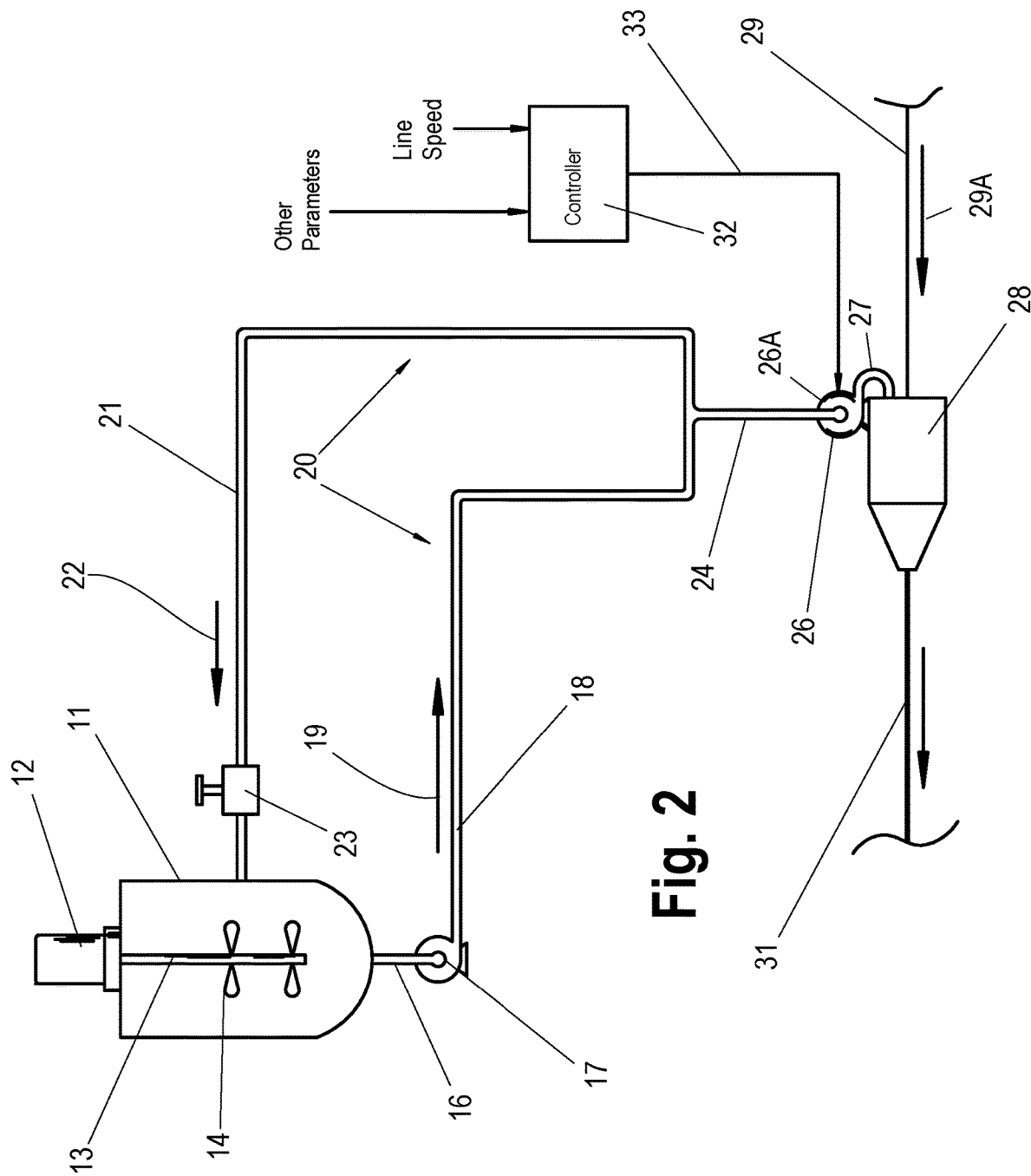
FIG. 2 is a schematic diagram of another example apparatus for carrying out the method disclosed herein.

FIG. 2 shows a second embodiment of the present disclosure. Here, the apparatus and process illustrated are substantially the same as the apparatus and process shown in FIG. 1 except that the second pump 26 is positioned closer to the die 28; for example, within a distance of approximately 1 foot to 12 feet of the die 28, and, in some embodiments, can be integrated with the die 28. In some embodiments, the second pump 26 is positioned within a distance of 2 feet to 12 feet, 3 feet to 12 feet, 4 feet to 12 feet, 5 feet to 12 feet, 6 feet to 12 feet, 7 feet to 12 feet, 8 feet to 12 feet, 9 feet to 12 feet, 10 feet to 12 feet, 11 feet to 12 feet, 1 foot to 10 feet, 1 foot to 8 feet, 1 foot to 6 feet, 1 foot to 4 feet, 1 foot to 3 feet, 1 foot to 2 feet, 4 feet to 12 feet, 4 feet to 10 feet, 4 feet to 8 feet, 4 feet to 6 feet, 4 feet to 5 feet, 6 feet to 12 feet, 6 feet to 10 feet, 6 feet to 8 feet, 8 feet to 12 feet, 8 feet to 10 feet, or 10 feet to 12 feet of the die 28. In this way, a length of the supply line 27 from the second pump 26 to the die 28 can be shortened and/or arranged in more of a straight-line alignment with the die 28, to create a more direct path between the supply line 27 and the die 28 to facilitate and help maintain a consistent and controlled mixture flow and pressure to the die 28.

Figure 3:
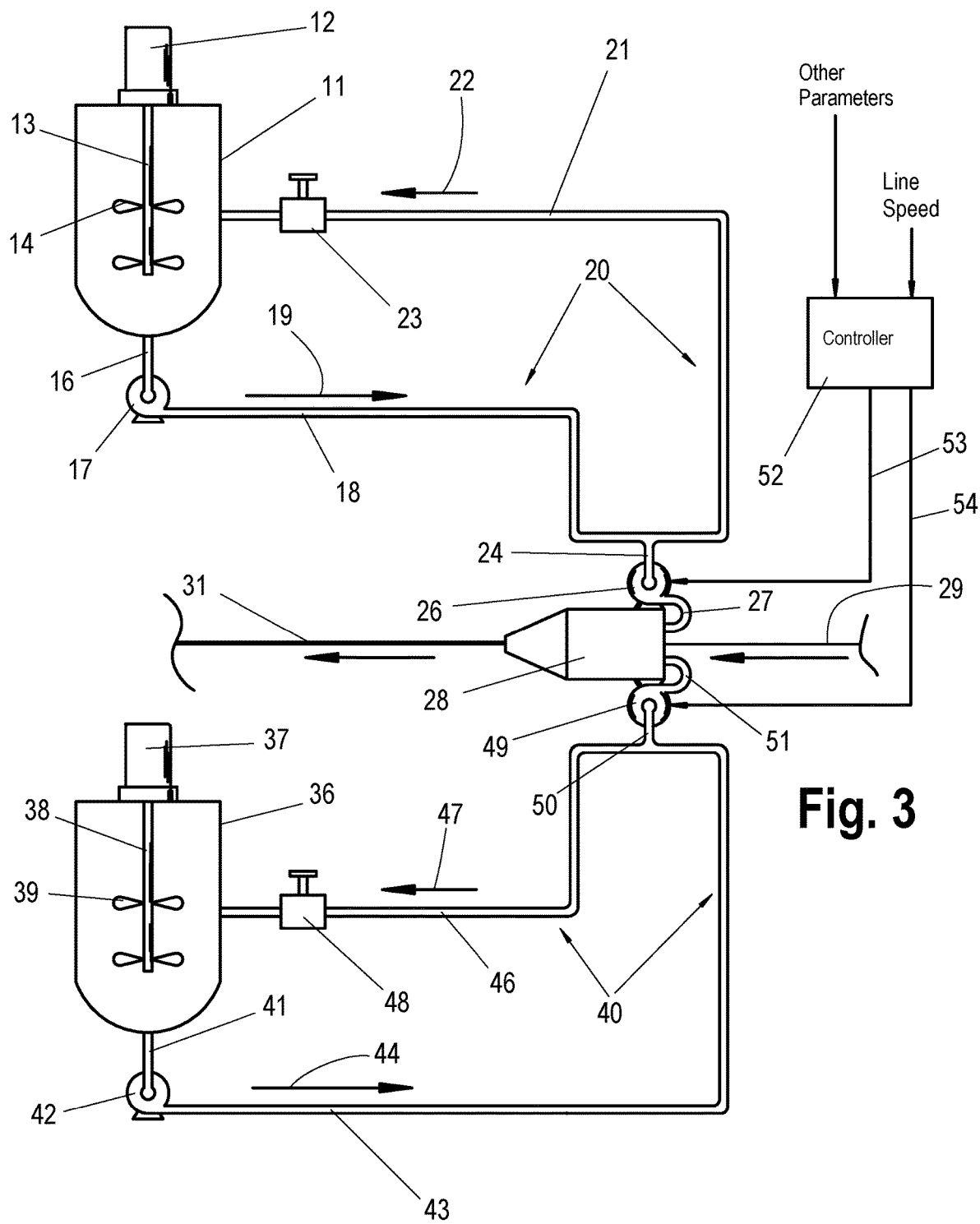
FIG. 3 is a schematic diagram of an example apparatus for carrying the method disclosed herein when both sides of a moving substrate are to be coated with material.

In some instances, it may be desired to coat both surfaces of a moving substrate 29. FIG. 3 shows an embodiment of the present disclosure for carrying out such a double coating. The upper portion of FIG. 3 (above the die 28) is the same apparatus shown in FIG. 2 and need not be described again in detail. The die 28 in this embodiment comprises a two sided die configured to extrude coating mixtures, which can include application of mixtures formed from high viscosity material to both sides of the substrate 29 or to one side, with another coating mixture applied to the opposite side of the substrate 29. The die 28 will extrude each mixture onto the top surface and the bottom surface of the moving substrate 29. Multiple pumps may be used to supply both inlets of the die in this embodiment to facilitate feeding of each mixture to the die 28 because, among other reasons, the bottom and top material may vary, the desired thicknesses of the coatings may be different, and/or the rheology of the two mixtures may be different.

To address these potential variations in mixtures, such as the thickness and rheology of the mixtures, FIG. 3 shows a second apparatus for implementing the coating on, in this case, the bottom surface of the moving substrate 29. The second apparatus is similar to that shown in FIG. 2 and comprises a second heat and mix tank 36 and a second motor 37 that drives a shaft 38 to which is attached agitator blades or paddles 39. A third pump 42 draws a heated and substantially homogenous mixture, formed from a high viscosity material in the second tank 36, from the second tank 36 and moves it around a second circulation loop 40, first in direction 44 through outlet line 43 and then back to the tank 36 in direction 47 through return line 46. A second pressure control valve 48 maintains a predetermined pressure of the mixture within the circulation loop 40 as described above.

A second suction line 50 taps the mixture moving through the second circulation loop 40 and is attached to a fourth pump 49. As with the second pump 26, the fourth pump 49 may be a positive displacement pump driven by a second variable speed drive such as a servo motor, a VFD, or an AC motor for example. The second variable speed drive of the fourth pump 49 is controllable to vary the flow and pressure of the mixture delivered to the lower portion of die 28 (to be deposited on the bottom surface of the substrate 29) independently of the flow and pressure of the mixture delivered to the upper portion of die 28. Electronic controller 52 is programmed to continuously receive input data that includes at least the current line speed of the moving substrate 29.

Based upon the input data, the controller 52 calculates, in real time, the speed at which both the variable speed drive of the second pump 26 and the second variable speed drive of the fourth pump 49 should be driven to maintain a predetermined thickness and consistency of each mixture extruded by the die 28 both on the top surface and on the bottom surface of the substrate 29. Control signals are then streamed to the variable speed drive of the second pump 26 via control line 53 and are streamed to the second variable speed drive of the fourth pump 49 via control line 54. This happens continuously such as, for example, several times per second. As a consequence, the speed of the second pump 26 and the fourth pump 49 are varied in real time to maintain a uniform thickness and a consistency of each mixture coated on both surfaces of the moving substrate 29, even as the line speed and perhaps other conditions vary with time.

The apparatus and methods discussed above with regard to FIG. 1-3 can be utilized for batch coating of shingle materials with mixtures formed from high viscosity materials, and further can be used as part of a substantially continuous coating process. In such a continuous coating process, a surge tank can be positioned between the mixer (11 as shown in FIGS. 1-2 and 11 and 36 as shown in FIG. 3). The mixer will substantially continuously heat and mix a high viscosity material and will supply the resultant mixture to the surge tank, which can maintain a supply of the heated mixture for feeding to the circulation loop and application to the substrate.

The present disclosure has been described above in terms of example mechanisms and methodologies that embody and exemplify the present disclosure. It will be understood by the skilled artisan, however, that a wide gamut of additions, deletions, and modifications, both subtle and gross, might well be made to the illustrative embodiments without departing from the spirit and scope of the present disclosure.

The invention claimed is:

1. A method comprising the steps of:
moving a substrate along a processing path at a line speed;
heating and mixing a viscous material having a viscosity of 10,000 cP to 20,000 cP at 375° Fahrenheit in a heated mixing and melting tank to obtain a substantially homogeneous mixture;
pumping the mixture from the tank, through a circulation loop, and back to the tank using a first pump;
controlling a pressure of the mixture within the circulation loop as the mixture is circulated through the circulation loop;
wherein controlling the pressure in the circulation loop as the mixture is circulated through the circulation loop comprises adjusting a pressure control valve positioned along a return line of the circulation loop to control to substantially maintain a predetermined pressure of the mixture within the circulation loop;
extracting at least part of the mixture from the circulation loop using a second pump coupled to the circulation loop, and recirculating a remaining portion of the mixture though the circulation loop and back to the tank along the return line;
wherein the at least part of the mixture is extracted from the circulation loop by the second pump at the predetermined pressure of the mixture within the circulation loop;
using the second pump, pumping the at least part of the mixture through an extrusion die at a pressure greater than the predetermined pressure of the mixture within the circulation loop and onto the substrate; and
wherein the at least part of the mixture extracted by the second pump is controlled to provide a mixture flow to the extrusion die sufficient to apply a coating of the mixture onto the substrate having a selected coating thickness;
controlling the pumping of the at least part of the mixture by the second pump based, at least in part, on the line speed of the substrate so that the coating of the mixture is deposited onto the substrate at the coating thickness by the extrusion die as the substrate is moved along the processing path at the line speed.

2. The method of claim 1, wherein the step of moving the substrate comprises moving a shingle material along the processing path, wherein the shingle material comprises a glass mat.

3. The method of claim 1, wherein the second pump comprises a positive displacement pump.

4. The method of claim 1, wherein the viscous material comprises a non-asphaltic material.

5. The method of claim 1, wherein the viscous material comprises a polymer material.

6. The method of claim 1, where the pressure in the circulation loop is 50 psi to 200 psi.

7. The method of claim 1, where the extrusion die comprises a pultrusion die.

8. The method of claim 7, wherein the step of moving the substrate further comprises moving the substrate through the pultrusion die.

9. The method of claim 1, wherein the step of the controlling the pumping of the at least part of the mixture by the second pump comprises controlling the second pump with a variable speed drive.

10. The method of claim 9, wherein the variable speed drive comprises a servo motor, a variable frequency drive, or an AC motor.

11. The method of claim 9, wherein the step of controlling the pumping of the at least part of the mixture by the second pump comprises controlling the variable speed drive with a closed loop controller configured to monitor at least the line speed of the substrate and control a speed of the variable speed drive as a function of the line speed.

12. The method of claim 1, wherein the extrusion die is configured to apply a coating to two sides of the substrate and further comprising the steps of:
mixing a second viscous material having a viscosity of 10,000 cP to 20,000 cP at 375° Fahrenheit in a second tank to obtain a second mixture;
pumping the second mixture from the tank, through a second circulation loop, and back to the second tank using a third pump;
controlling a pressure in the second circulation loop as the second mixture is circulated through the second circulation loop;
extracting at least part of the second mixture from the second circulation loop using a fourth pump coupled to the second circulation loop;
using the fourth pump, pumping the at least part of the second mixture through the extrusion die and onto a second surface of the substrate; and
controlling the pumping of the fourth pump based, at least in part, on the line speed of the substrate so that a coating of the second viscous material is deposited by the extrusion die onto the second surface of the substrate as the substrate is moved along the processing path at the line speed.

13. The method of claim 1, wherein the circulation loop comprises a closed loop; wherein controlling the pumping of the at least part of the mixture by the second pump comprises controlling a variable speed drive coupled to the second pump with a closed loop controller configured to monitor the line speed of the substrate, pressure of the mixture extracted by the second pump, a temperature for the mixture, the coating thickness, coating consistency, or combinations thereof; and wherein as the second pump extracts the at least part of the mixture from the circulation loop, adjusting the pressure control valve to maintain the predetermined pressure in the circulation loop.

14. The method of claim 12, wherein controlling the pressure in the second circulation loop as the second mixture is circulated through the second circulation loop comprises adjusting a flow control valve positioned along a return line of the circulation loop to control as the mixture is circulated back to the second tank.

15. The method of claim 1, further comprising monitoring a pressure of the mixture being pumped through the first pump, and if the monitored pressure exceeds the predetermined pressure, directing a portion of the mixture from the first pump back to the tank through a bypass valve.

16. The method of claim 1, further comprising feeding the mixture to a surge tank positioned between the tank and the circulation loop to maintain a supply of the mixture for feeding to the circulation loop.

17. The method of claim 1, further comprising shutting down the second pump if the predetermined pressure of the mixture at an inlet of the second pump exceeds a threshold pressure.

18. The method of claim 1, wherein controlling the pumping of the at least part of the mixture by the second pump comprises controlling a variable speed drive coupled to the second pump with a closed loop controller configured to receive input data from a plurality of sensors, the data including a current line speed at which the substrate is moving, and including the pressure of the mixture pumped to the extrusion die by the second pump, temperature of the mixture, the coating thickness of the mixture, coating consistency of the mixture, or combinations thereof; wherein the variable speed drive is controlled to adjust the pressure of the at least part of the mixture delivered to the extrusion die for applying the coating having the coating thickness to the substrate in view of the line speed of the substrate.

* * * * *